(12) United States Patent
Park et al.

(10) Patent No.: US 8,947,304 B2
(45) Date of Patent: Feb. 3, 2015

(54) MOBILE TERMINAL HAVING A METAL-BASED COVER MEMBER

(75) Inventors: Kyungui Park, Seoul (KR); Gyutaek Lee, Seoul (KR); Jaeeon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 13/398,634

(22) Filed: Feb. 16, 2012

(65) Prior Publication Data

US 2012/0329531 A1 Dec. 27, 2012

(30) Foreign Application Priority Data

Jun. 21, 2011 (KR) .................. 10-2011-0060072

(51) Int. Cl.
| | | |
|---|---|---|
| *H04B 1/38* | (2006.01) | |
| *H01Q 1/24* | (2006.01) | |
| *H04M 1/02* | (2006.01) | |
| *H01Q 1/38* | (2006.01) | |

(52) U.S. Cl.
CPC ............. *H01Q 1/242* (2013.01); *H04M 1/0202* (2013.01); *H04M 1/026* (2013.01); *H01Q 1/38* (2013.01)
USPC ............................. 343/702; 343/767; 455/572

(58) Field of Classification Search
CPC ........... H01L 2224/32225; H01L 2224/32245; H01L 2224/83; H01L 2224/85; H01L 2224/13099; G11B 5/486; G11B 5/4853; G02B 6/4277; G02B 6/3827
USPC .......... 174/250, 252, 254, 260–262; 257/100, 257/678, 700, 723, 773, 780, 99; 343/702, 343/870; 361/715, 719, 760, 777; 455/575.1–575.7
See application file for complete search history.

(56) References Cited

U.S. PATENT DOCUMENTS

| | | | |
|---|---|---|---|
| 2006/0208951 A1* | 9/2006 | Korva et al. .................. | 343/702 |
| 2007/0238492 A1* | 10/2007 | Kaneko et al. ................ | 455/573 |
| 2007/0241971 A1* | 10/2007 | Tsujimura et al. ............ | 343/702 |
| 2010/0123633 A1* | 5/2010 | Ozden et al. .................. | 343/702 |
| 2010/0156750 A1* | 6/2010 | Ishibashi et al. .............. | 343/873 |

* cited by examiner

*Primary Examiner* — Golam Sorowar
(74) *Attorney, Agent, or Firm* — Lee, Hong, Degerman, Kang & Waimey

(57) ABSTRACT

A mobile terminal is disclosed. The present invention includes a front case, a rear case mounted to the front case, a controller provided between the front case and the rear case, a power supply provided in the rear case and a cover member provided on the rear case, the cover member comprising an insulating layer configured to oppose the power supply and a conductive layer located on the insulating layer such that the conductive layer is externally exposed, wherein the conductive layer is electrically connected to the controller for wireless communication.

15 Claims, 7 Drawing Sheets

(a)    (b)

MOBILE TERMINAL HAVING A METAL-BASED COVER MEMBER

Pursuant to 35 U.S.C. §119(a), this application claims the benefit of earlier filing date and right of priority to Korean Application No. 10-2011-0060072, filed on Jun. 21, 2011 the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for implementing a fancy exterior design through a metal-based cover member, preventing performance of a wireless communication unit from being degraded using a metal-based cover member, utilizing a cover member as an antenna for wireless communication, and implementing a design pattern on a cover member.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal, by which a fancy exterior design may be implemented through a metal-based cover member.

Another object of the present invention is to provide a mobile terminal, by which performance of a wireless communication unit may be prevented from being degraded using a metal-based cover member.

Another object of the present invention is to provide a mobile terminal, by which a cover member may be utilized as an antenna for wireless communication.

A further object of the present invention is to provide a mobile terminal, by which a design pattern may be implemented on a cover member.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a front case, a rear case mounted to the front case, a controller provided between the front case and the rear case, a power supply provided in the rear case and a cover member provided on the rear case, the cover member comprising an insulating layer configured to oppose the power supply and a conductive layer located on the insulating layer such that the conductive layer is externally exposed, wherein the conductive layer is electrically connected to the controller for wireless communication.

Preferably, the conductive layer may be formed of a conductive ink or a metal-based material and the insulating layer may be formed of a resin material.

More preferably, the conductive layer may form a prescribed pattern on the insulating layer.

More preferably, the conductive layer may be configured to provide at least a GPS antenna, a Wi-Fi antenna, a Bluetooth™ antenna or an NFC antenna.

More preferably, wherein each of the first and second conductive layers may provide at least a GPS antenna, a Wi-Fi antenna, a Bluetooth™ antenna or an NFC antenna.

More preferably, the cover member may comprise a contact terminal electronically connected to the conductive layer, the controller comprises a connecting terminal electrically connected to the contact terminal and the connecting terminal is exposed to the contact terminal by penetrating a perforating hole provided in the rear case.

More preferably, the connecting terminal may comprise a clip configured to be inserted in or projected out of the perforating hole according to a status of contact between the connecting terminal and the contact terminal.

More preferably, the cover member may further comprise a color layer provided between the insulating layer and the conductive layer and a transparent resin layer located on the conductive layer.

More preferably, the color layer is spaced apart by a specific interval from the conductive layer.

In another aspect of the present invention, a mobile terminal may include a front case, a rear case mounted to the front case, a controller provided between the front case and the rear case, a wireless communication unit electrically connected to the controller, a power supply provided in the rear case and a cover member provided on the rear case, the cover member comprising an insulating layer opposing the power supply and a conductive layer enclosing the insulating layer such that the conductive layer is externally exposed, wherein at least one portion of the insulating layer is externally exposed by penetrating the conductive layer.

More preferably, the conductive layer may comprise a conductive ink or a metal-based material, and the insulating layer comprises a resin material.

More preferably, the conductive layer may comprise a plurality of penetrating holes and the insulating layer comprises a plurality of projections each of which is inserted in a corresponding one of the plurality of penetrating holes.

More preferably, each of a plurality of projections may be configured to have a cross-sectional area decrease in a direction of its insertion into the corresponding one of the plurality of penetrating holes and each of the plurality of penetrating holes may be configured to match the cross-sectional area of the corresponding one of the plurality of projections.

More preferably, each of the plurality of projections may be configured to connect the wireless communication unit to an outer environment.

More preferably, the conductive layer and the insulating layer may be formed by injection molding.

More preferably, the cover member may comprise a contact terminal electrically connected to the conductive layer and the contact terminal is electrically connected to the controller for wireless communication.

More preferably, the controller may comprise a connecting terminal electrically connected to the contact terminal, and the connecting terminal is exposed to the contact terminal by penetrating a perforating hole provided in the rear case.

More preferably, the connecting terminal comprises a clip configured to be inserted in or projected out of the perforating hole according to a status of contact between the connecting terminal and the contact terminal.

More preferably, the conductive layer may be configured to provide at east a GPS antenna, a Wi-Fi antenna, a Bluetooth™ antenna or an NFC antenna.

Accordingly, the present invention provides the following effects and/or advantages.

First of all, a mobile terminal according to at least one embodiment of the present invention may implement a fancy exterior design through a metal-based cover member.

Secondly, a mobile terminal according to at least one embodiment of the present invention may prevent performance of a wireless communication unit from being degraded using a metal-based cover member.

Thirdly, a mobile terminal according to at least one embodiment of the present invention may utilize a cover member as an antenna for wireless communication.

Fourthly, a mobile terminal according to at least one embodiment of the present invention may implement a design pattern on a cover member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
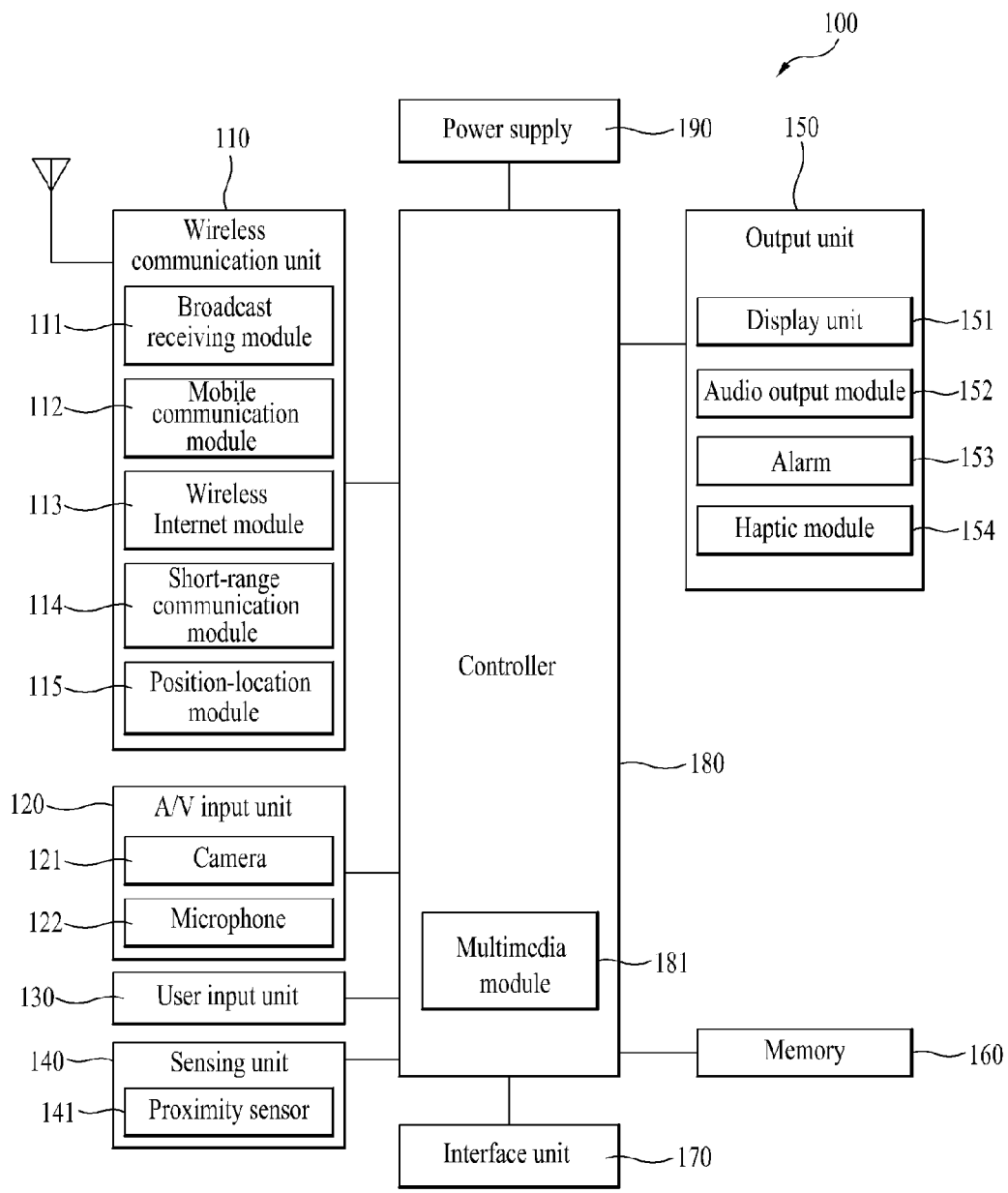
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
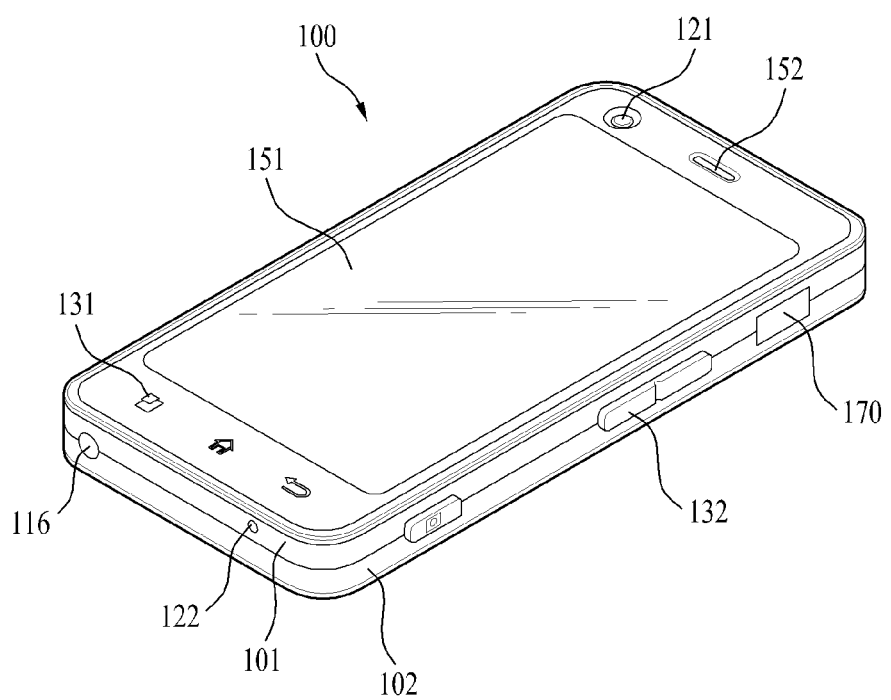
FIG. 2 is a front perspective diagram of a mobile terminal according to one embodiment of the present invention.

FIG. 2 is a front perspective diagram for one example of a mobile terminal according to one embodiment of the present invention.

The mobile terminal 100 shown in the drawing has a bar type terminal body (cf. FIGS. 2 to 5), which may non-limit the present invention. Moreover, the mobile terminal 100 may be implemented in a variety of different configurations. Examples of such configurations include a slide type, a folder type (cf. FIG. 6), a swing type, a swivel type and the like, in which at least two bodies are assembled to enable relative motion.

Referring to FIG. 2, a body of the mobile terminal 100 may include a case (e.g., a casing, a housing, a cover, etc.) configuring an exterior thereof. According to the present embodiment, the case may be divided into a front case 101 and a rear case 102. Various electric/electronic parts may be loaded in a space provided between the front and rear cases 101 and 102. Optionally, at least one middle case may be further provided between the front and rear cases 101 and 102 in addition.

The cases 101 and 102 may be formed by injection molding of synthetic resin or metal substance such as stainless steel (STS), titanium (Ti) and the like for example.

A display 151, an audio output unit 152, a camera 121, a user input unit 130 (131/132), a microphone 122, an interface 170 and the like may be provided to the terminal body, and mainly, to the front case 101.

The display 151 may occupy most of a main face of the front case 101. The audio output unit 151 and the camera 121 may be provided to an area adjacent to one of both end portions of the display 151, while the user input unit 131 and the microphone 122 may be provided to another area adjacent to the other end portion of the display 151. The user input unit 132, the interface 170 and the like may be provided to lateral sides of the front and rear cases 101 and 102.

The user input unit 130 may be manipulated to receive an input of a command for controlling an operation of the terminal 100. And, the input unit 130 may be able to include a plurality of manipulating units 131 and 132. The manipulating units 131 and 132 may be generally named a manipulating portion and may adopt any mechanism of a tactile manner that enables a user to perform a manipulating action by experiencing a tactile feeling.

Contents inputted by the manipulating units 131 and 132 may be set in various ways. For instance, such a command as start, end, scroll and the like may be inputted to the first manipulating unit 131. And, a command for a volume adjustment of sound outputted from the audio output unit 152, a command for a switching to a touch recognizing mode of the display 151 or the like may be inputted to the second manipulating unit 132.

Figure 3:
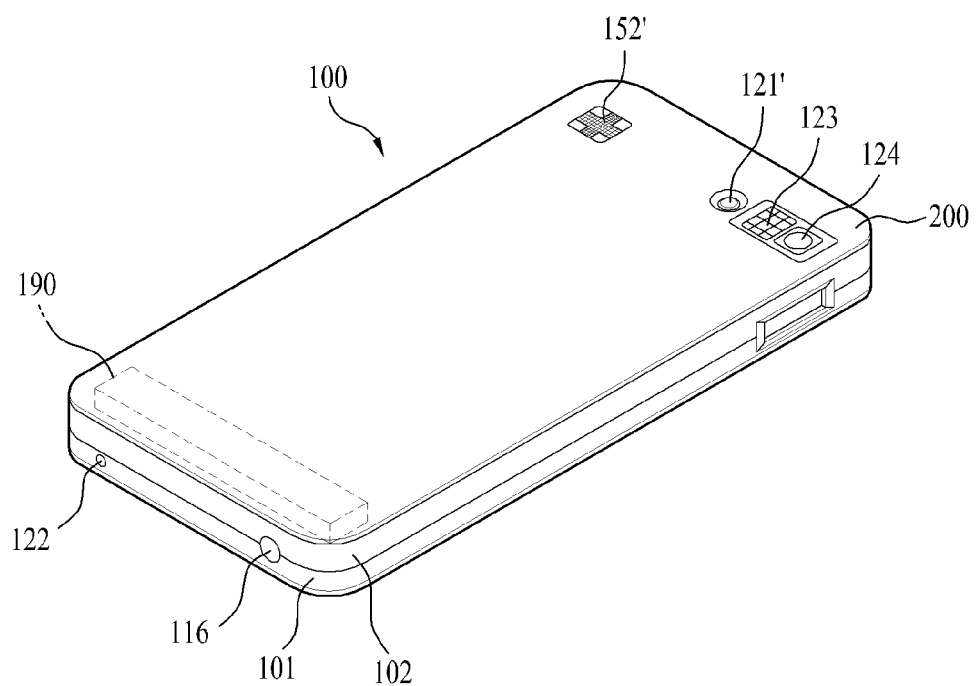
FIG. 3 is a rear perspective diagram of a mobile terminal according to one embodiment of the present invention.

FIG. 3 is a perspective diagram of a backside of the mobile terminal 100 shown in FIG. 2.

Referring to FIG. 3, a camera 121' may be additionally provided to a backside of the terminal body, and more particularly, to the rear case 102. The camera 121' has a photographing direction that is substantially opposite to that of the former camera 121 shown in FIG. 2 and may have pixels differing from those of the former camera 121.

For instance, the former camera 121 may have low pixels enough to take and transmit a picture of user's face for a video call, while the latter camera 121' may have high pixels for capturing a general subject for photography without transmitting the captured subject. And, each of the cameras 121 and 121' may be installed at the terminal body to be rotatable or popped up.

A flash 123 and a mirror 124 may be additionally provided adjacent to the camera 121'. The flash 123 projects light toward a subject in case of photographing the subject using the camera 121'. In case that a user attempts to take a picture of the user (self-photographing) using the camera 121', the mirror 124 enables the user to view user's face reflected by the mirror 124.

An additional audio output unit 152' may be provided to the backside of the terminal body. The additional audio output unit 152' may be able to implement a stereo function together with the former audio output unit 152 shown in FIG. 2 and may be used for implementation of a speakerphone mode in case of talking over the terminal.

A broadcast signal receiving antenna 124 may be additionally provided to the lateral side of the terminal body as well as an antenna for communication or the like. The antenna 124 constructing a portion of the broadcast receiving module 111 shown in FIG. 1 may be retractably provided to the terminal body.

A power supply 190 for supplying a power to the mobile terminal 100 may be provided to the terminal body. And, the power supply 190 may be configured to be built within the terminal body. Alternatively, the power supply 190 may be configured to be detachably connected to the terminal body.

In case that the power supply 190 is configured to be detachably connected to the terminal body, a partial region of the power supply 190 may be inserted in the rear case 102 and a cover member 200 is detachably mounted on the rear case 102 to enclose the power supply 190.

Figure 4:
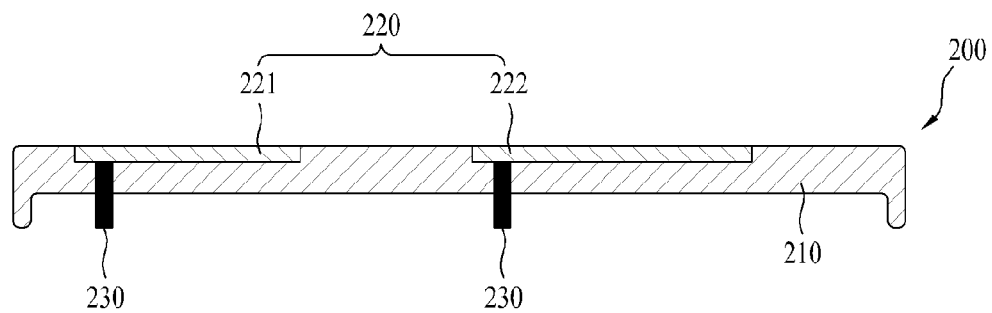
FIG. 4 is a cross-sectional diagram for one example of a cover member configuring a mobile terminal according to one embodiment of the present invention.
Figure 5:
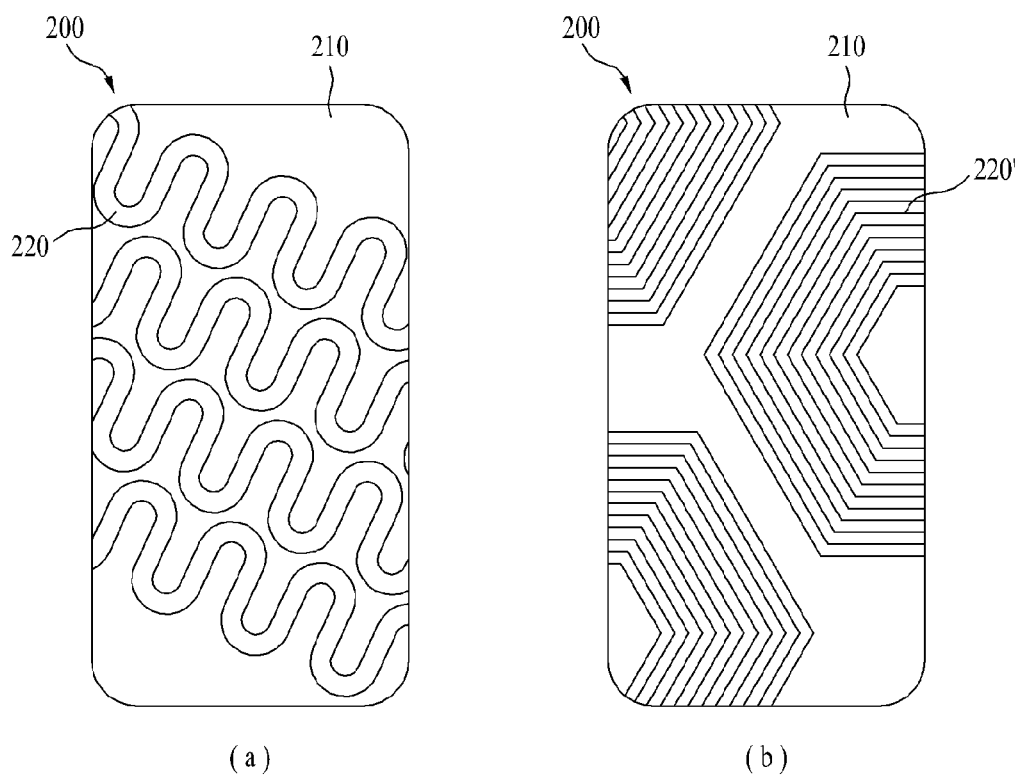
FIG. 5 is a layout of a cover member configuring a mobile terminal according to one embodiment of the present invention.

FIG. 4 is a cross-sectional diagram for one example of a cover member configuring a mobile terminal according to one embodiment of the present invention. FIG. 5 is a layout of a cover member configuring a mobile terminal according to one embodiment of the present invention.

Referring to FIG. 4 and FIG. 5, a mobile terminal 100 according to one embodiment of the present invention may include a front case 101, a rear case 102, a controller 180, a power supply 190 and a cover member 200.

As mentioned in the foregoing description with reference to FIGS. 1 to 3, various electric/electronic parts may be loaded in the space between the front case 101 and he rear case 102. The controller 180 may be provided as a circuit board to a space between the front case 101 and the rear case 102. And, the power supply 190 may be provided to the rear case 102 in a manner of being easily detachable from the terminal body.

The cover member 200 may be detachably provided to the rear case 102 by enclosing the power supply 190 and may form a backside exterior of the mobile terminal 100. Meanwhile, the mobile terminal 100 may include a wireless communication unit 112 that includes at least one of a broadcast receiving module 111, a mobile communication module 112, a wireless internet module 113, a short-range communication module 114 and a position-location module 115.

For the transmission and reception by the wireless communication unit 112, the mobile terminal 100 may include a plurality of antennas respectively corresponding to the modules 111 to 115 of the wireless communication unit 112.

As the mobile terminal 100 tends to get slimmer, the space utilization due to the arrangement of electric/electronic parts becomes more important. If a plurality of the antennas are entirely provided to the inner space between the front case 101 and the rear case 102, as mentioned in the above description, it may be difficult to avoid increasing the thickness and size of the mobile terminal 100.

Referring to FIG. 4, the cover member 200 may include an insulating layer 210 configured to oppose the power supply 190 and a conductive layer 220 formed on the insulating layer 210.

In particular, the conductive layer 220 may be electrically connected to the controller 180 for the implementation of wireless communication. In more particular, the conductive layer 220 is electrically connected to various transmitting/receiving units provided to the controller 180 to work as an antenna having radiation property of various frequency bands.

For example, such an contact terminal 230 for the connection to the controller as a power supply terminal, a ground terminal and the like may be provided to one end portion of the conductive layer 220, a power supply pad to be connected to the power supply terminal and a ground pad to be connected to the ground terminal may be provided to the controller 180, and the electrical connectivity between the controller 180 and the conductive layer 220 shall be described with reference to the accompanying drawings later.

The conductive layer is located on the insulating layer such that the conductive layer is externally exposed. The conductive layer is electrically connected to the controller for wireless communication The conductive layer 220 may be formed of conductive ink or metal-based material. In particular, the conductive ink may include a metal powder, a polymer binder and a solvent. In more particular, the metal powder may contain silver (Ag) over 80%. And, if the conductive layer 220 is formed of the conductive ink, it may apply a pad printing method.

Since the conductive layer 220 implements an exterior design of metal-based substance, it may be able to provide a fancy sense of beauty. The conductive layer 220 formed of the conductive ink or the metal-based material may provide at least a GPS antenna, a Wi-Fi antenna, a Bluetooth™ antenna or an NFC antenna.

Thus, in case that the conductive layer 220 is used as the antenna for the wireless communication, since a wide area of the cover member 200 is utilizable, an electric length may be non-limited. Moreover, referring to FIG. 5 (a) and FIG. 5 (b), since it may be able to form a conductive layer 220 or 220' having such a various pattern as a meander pattern, a spiral pattern and the like, a degree of freedom in design may be enhanced and a specific design pattern may be implemented as well.

Moreover, the cover member 200 may include a protective layer (not shown in the drawing) to protect the conductive layer 220 from external shock, moisture and the like.

Meanwhile, referring to FIG. 4, the conductive layer 220 may include a first conductive layer 221 formed on a specific region of the insulating layer 210 and a second conductive layer 222 formed on another region of the insulating layer 210. In this case, each of the conductive layers 221 and 222 may work as at least one of GPS antenna, Wi-Fi antenna, Bluetooth™ antenna and NFC antenna.

For instance, the first conductive layer 221 may work as the Bluetooth antenna and the second conductive layer 222 may work as the NFC antenna. And, the first conductive layer 221 and the second conductive layer may be formed to differ from each other in design pattern.

The insulating layer 210 may be formed of a resin material having one of various colors. And, the insulating layer 210 may be formed on the insulating layer 210 to cover all or partial regions of the insulating layer 210.

Figure 6:
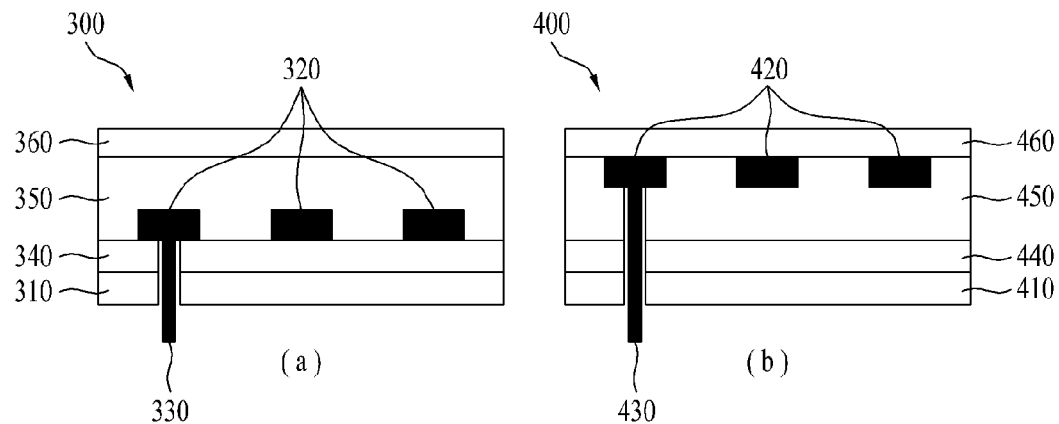
FIG. 6 is a conceptional diagram of another example of a cover member configuring a mobile terminal according to one embodiment of the present invention.

FIG. 6 is a conceptional diagram of another example of a cover member configuring a mobile terminal according to one embodiment of the present invention.

Referring to FIG. 6 (a), a cover member 300 may include an insulating layer 310, a color layer 240 formed on the insulating layer 310, a transparent resin layer 350 formed on the color layer 340, a conductive layer 320 formed between the transparent resin layer 350 and the color layer 340 and a contact terminal 330 connected to the conductive layer 320 to be externally exposed by penetrating the insulating layer 310. And, the cover member 300 may further include a UV coating layer 360 formed on the transparent resin layer 350.

On the other hand, referring to FIG. 6 (b), a cover member 400 may include an insulating layer 410, a color layer 440 formed on the insulating layer 410, a transparent resin layer 450 formed on the color layer 440, a UV coating layer 460 formed on the transparent resin layer 450, and a conductive layer 420 formed between the UV coating layer 460 and the transparent resin layer 450.

Referring to FIG. 6 (a), the conductive layer 420 may be provided to a bottom part of the transparent resin layer 350 to be adjacent to the color layer 340. Referring to FIG. 6 (b), the conductive layer 420 may be provided to a top part of the transparent resin layer 450 to be spaced apart from the color layer 440. Therefore, the cover member 300/400 may be able to implement a stereoscopic effect attributed to a depth difference between the color layer 340/440 and the conductive layer 320/420.

The conductive layer 320/420 may be formed of a conductive ink or a metal-based material and may include a metal film or a metal sticker.

In the following description, a configuration for connecting the controller 180 to the conductive layer 220 of the cover member 200 is explained in detail with reference to the accompanying drawings.

Figure 7:
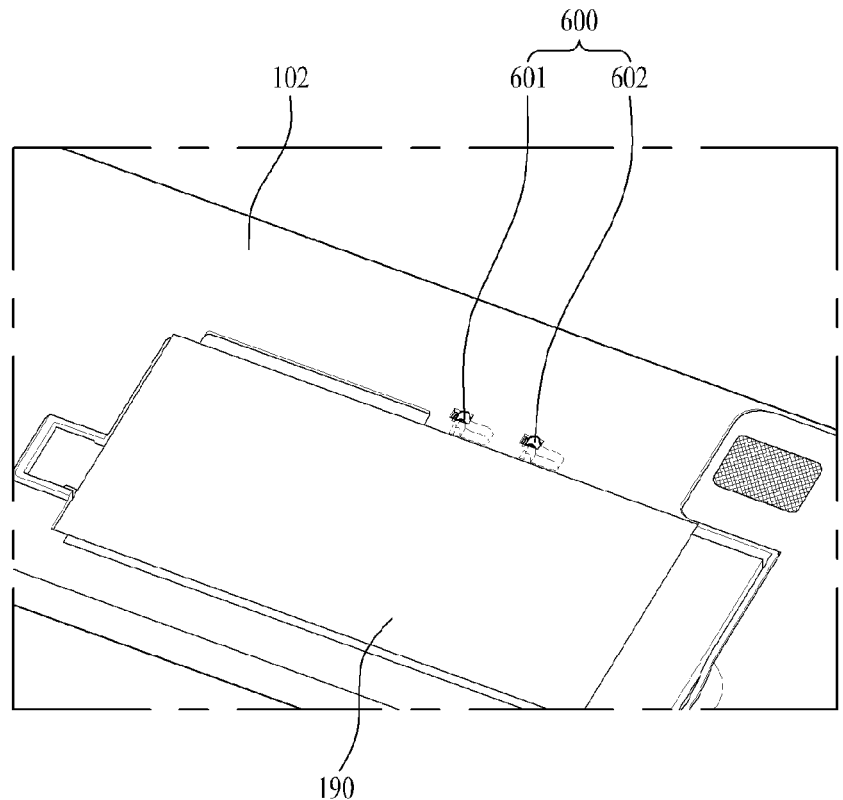
FIG. 7 is a detailed perspective diagram of a mobile terminal according to one embodiment of the present invention.
Figure 8:
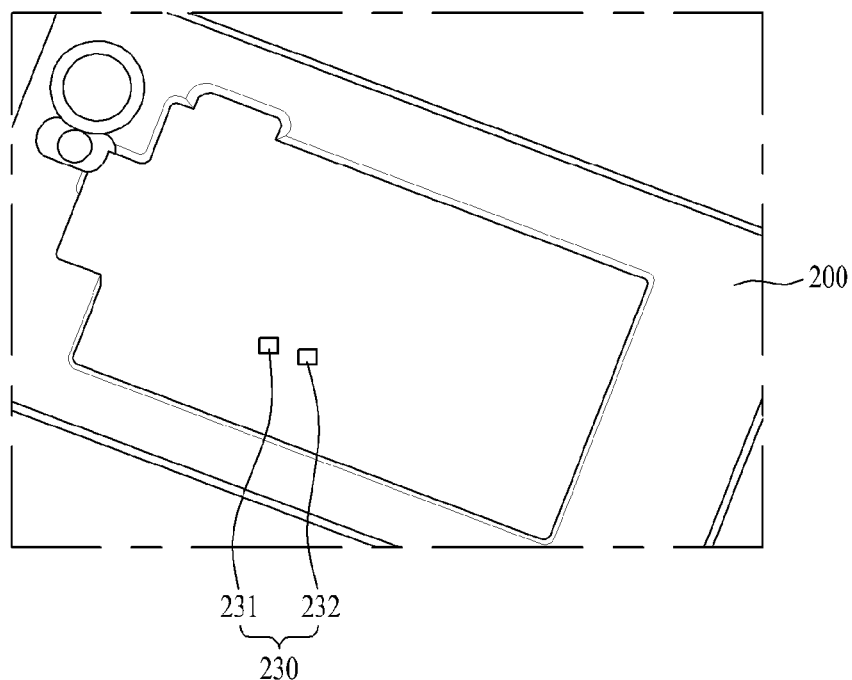
FIG. 8 is a perspective bottom view of a cover member configuring a mobile terminal according to one embodiment of the present invention.
Figure 9:
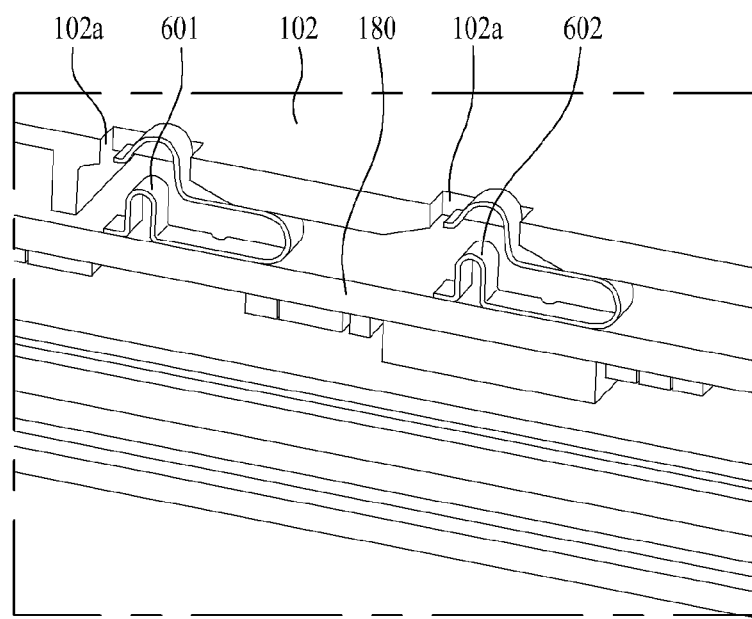
FIG. 9 is an enlarged diagram of the mobile terminal shown in FIG. 7.

FIG. 7 is a detailed perspective diagram of a mobile terminal according to one embodiment of the present invention. FIG. 8 is a perspective bottom view of a cover member configuring a mobile terminal according to one embodiment of the present invention. FIG. 9 is an enlarged diagram of the mobile terminal shown in FIG. 7.

Referring to FIGS. 7 to 9, the cover member 200 may include a contact terminal 230 connected to the conductive layer 220 to be externally exposed by penetrating the insulating layer 210. and, the controller may include a connecting terminal 600 electrically connected to the contact terminal. And, the connecting terminal 600 may be exposed to the contact terminal 230 by passing through a perforating hole 102*a* formed in the rear case 102.

Meanwhile, the contact terminal 230 and the connecting terminal 600 may be separately configured into a plurality of terminals for a power supply and a ground. Referring to FIG. 7 and FIG. 8, the contact terminal 230 is separately configured into a first contact terminal 231 and a second contact terminal 232 for a power supply and a ground. And, the connecting terminal 600 is separately configured into a first connecting terminal 601 and a second connecting terminal 602 for a power supply and a ground.

Referring to FIG. 9, each of the connecting terminals 601 and 602 may include a clip for elastic transform inside or outside the perforating hole 102*a*.

The cover member 200 may be configured detachable from the rear case 102 in accordance with such a use status as a replacement of the power supply 190 and the like. As each of the connecting terminals 601 and 602 includes the elastic clip, it may be able to prevent damages from being caused by the collision between the contact terminal 231/232 and the connecting terminal 601/602 in the course of the corresponding detachment.

Figure 10:
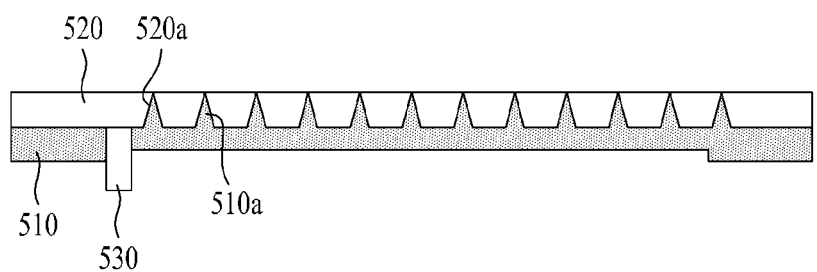
FIG. 10 is a conceptional diagram of a further example of a cover member configuring a mobile terminal according to one embodiment of the present invention.

FIG. 10 is a conceptional diagram of a further example of a cover member configuring a mobile terminal according to one embodiment of the present invention.

Referring to FIG. 10, a mobile terminal 100 according to another embodiment of the present invention may include a front case 101, a rear case 102, a controller 180 provided between the front case 101 and the rear case 102, a wireless communication unit 110 electrically connected to the controller 180, a power supply 190 provided to the rear case 102, and a cover member 500 mounted on the rear case 102 by including an insulating layer 510 opposing the power supply 190 and a conductive layer 520 enclosing the insulating layer 510 to be externally exposed. And, the insulating layer 510 may be externally exposed in a manner that at least one portion of the insulating layer 510 penetrates the conductive layer 510.

The conductive layer 520 may be formed of a conductive ink or a metal-based material. And, the insulating layer 510 is formed of a resin material.

As mentioned in the foregoing description, for the transmission and reception of the wireless communication unit 112, the mobile terminal 100 may include a plurality of antennas respectively corresponding to the modules 111 to 115 of the wireless communication unit 112. Yet, if the cover member 500 is formed of a metal-based material, it may cause a problem that radiation properties of the antennas are degraded.

According to the present embodiment, at least one portion of the insulating layer 510 is externally exposed in a manner of penetrating the conductive layer 520. And, the at least one portion (e.g., 510*a*) of the insulating layer 510 externally exposed by penetrating the conductive layer 520 plays a role in connecting the wireless communication unit 112 with an outer environment.

Therefore, the mobile terminal 100 according to the present invention applies a metal-based exterior design to the cover member 500 and may avoid degrading the performance of the wireless communication unit 112.

For one example, the conductive layer 520 may include a plurality of perforating holes 520*a* and the insulating layer 510 may include a plurality of projections 510*a* configured to be inserted in a plurality of the perforating holes 520*a*, respectively.

Each of the projections 510*a* may have a configuration that its cross-sectional area decreases in a direction of penetrating the conductive layer 520 and each of the penetrating holes 520*a* may have a configuration matching the configuration of the corresponding projection 510*a*. And, each of the projections 510*a* may be able to perform the function of connecting the wireless communication unit 112 with the outer environment.

In order to form the above-described projections 510*a* and the perforating holes 520*a*, a plurality of micro-holes are formed in the conductive layer 520 and the insulating layer 510 may be formed by injection molding with the conductive layer 520.

Meanwhile, the cover member 500 may include a contact terminal 530 connected to the conductive layer 520. For example, the contact terminal 530 may be configured to be externally exposed by penetrating the insulating layer 510. And, the contact terminal 530 may be electrically connected to the controller 180 for the wireless communication.

As mentioned in the foregoing description with reference to FIGS. 7 to 9, the controller 180 may include the connecting terminal 600 electrically connected to the contact terminal 530. The connecting terminal 600 may be exposed to the contact terminal 530 by penetrating the perforated hole 102*a* provided to the rear case 102. And, the connecting terminal 600 may include a clip for elastic transform inside or outside the perforating hole 102*a*.

The conductive layer 520 may work as one of GPS antenna, Wi-Fi antenna, Bluetooth antenna and NFC antenna.

As mentioned in the foregoing description, in case that the conductive layer 520 is used as an antenna for the wireless communication, it may be able to utilize a wide are of the cover member 500, whereby an electric length may be non-limited. Moreover, since it may be able to form a conductive layer having such a various pattern as a meander pattern, a spiral pattern and the like, a degree of freedom in design may be enhanced and a specific design pattern may be implemented as well.

As mentioned in the foregoing description, a mobile terminal according to at least one embodiment of the present invention may implement a fancy exterior design through a metal-based cover member.

And, a mobile terminal according to at least one embodiment of the present invention may prevent performance of a wireless communication unit from being degraded using a metal-based cover member.

Moreover, a mobile terminal according to at least one embodiment of the present invention may utilize a cover member as an antenna for wireless communication and may implement a design pattern on a cover member.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

As embodied and broadly described herein, a mobile terminal according to the present invention may include a front case, a rear case mounted to the front case, a controller provided between the front case and the rear case, a power supply provided in the rear case and a cover member provided on the rear case, the cover member comprising an insulating layer configured to oppose the power supply and a conductive layer located on the insulating layer such that the conductive layer is externally exposed, wherein the conductive layer is electrically connected to the controller for wireless communication.

Preferably, the conductive layer may be formed of a conductive ink or a metal-based material and the insulating layer may be formed of a resin material.

More preferably, the conductive layer may form a prescribed pattern on the insulating layer.

More preferably, the conductive layer may be configured to provide at least a GPS antenna, a Wi-Fi antenna, a Bluetooth™ antenna or an NFC antenna.

More preferably, wherein each of the first and second conductive layers may provide at least a GPS antenna, a Wi-Fi antenna, a Bluetooth™ antenna or an NFC antenna.

More preferably, the cover member may comprise a contact terminal electronically connected to the conductive layer, the controller comprises a connecting terminal electrically connected to the contact terminal and the connecting terminal is exposed to the contact terminal by penetrating a perforating hole provided in the rear case.

More preferably, the connecting terminal may comprise a clip configured to be inserted in or projected out of the perforating hole according to a status of contact between the connecting terminal and the contact terminal.

More preferably, the cover member may further comprise a color layer provided between the insulating layer and the conductive layer and a transparent resin layer located on the conductive layer.

More preferably, the color layer is spaced apart by a specific interval from the conductive layer.

In another aspect of the present invention, a mobile terminal may include a front case, a rear case mounted to the front case, a controller provided between the front case and the rear case, a wireless communication unit electrically connected to the controller, a power supply provided in the rear case and a cover member provided on the rear case, the cover member comprising an insulating layer opposing the power supply and a conductive layer enclosing the insulating layer such that the conductive layer is externally exposed, wherein at least one portion of the insulating layer is externally exposed by penetrating the conductive layer.

More preferably, the conductive layer may comprise a conductive ink or a metal-based material, and the insulating layer comprises a resin material.

More preferably, the conductive layer may comprise a plurality of penetrating holes and the insulating layer comprises a plurality of projections each of which is inserted in a corresponding one of the plurality of penetrating holes.

More preferably, each of a plurality of projections may be configured to have a cross-sectional area decrease in a direction of its insertion into the corresponding one of the plurality of penetrating holes and each of the plurality of penetrating holes may be configured to match the cross-sectional area of the corresponding one of the plurality of projections.

More preferably, each of the plurality of projections may be configured to connect the wireless communication unit to an outer environment.

More preferably, the conductive layer and the insulating layer may be formed by injection molding.

More preferably, the cover member may comprise a contact terminal electrically connected to the conductive layer and the contact terminal is electrically connected to the controller for wireless communication.

More preferably, the controller may comprise a connecting terminal electrically connected to the contact terminal, and the connecting terminal is exposed to the contact terminal by penetrating a perforating hole provided in the rear case.

More preferably, the connecting terminal comprises a clip configured to be inserted in or projected out of the perforating hole according to a status of contact between the connecting terminal and the contact terminal.

More preferably, the conductive layer may be configured to provide at east a GPS antenna, a Wi-Fi antenna, a Bluetooth™ antenna or an NFC antenna.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a front case;
a rear case mounted to the front case;
a controller provided between the front case and the rear case;
a power supply provided in the rear case; and
a cover member provided on the rear case, the cover member comprising an insulating layer configured to oppose the power supply and a conductive layer located on the insulating layer such that the conductive layer is externally exposed,
wherein the conductive layer is electrically connected to the controller for wireless communication,
wherein the cover member further comprises a color layer located between the insulating layer and the conductive layer,
wherein a transparent resin layer is located on the color layer,
wherein the conductive layer is located on a top portion of the transparent resin layer and is spaced apart from the color layer by a specific interval, and
wherein the conductive layer implements a stereoscopic effect due to the transparent resin layer, the stereoscopic effect based upon a depth difference between the color layer and the conductive layer.

2. The mobile terminal of claim 1, wherein:
the conductive layer is formed of a conductive ink or a metal-based material; and
the insulating layer is formed of a resin material.

3. The mobile terminal of claim 2, wherein the conductive layer forms a prescribed pattern on the insulating layer.

4. The mobile terminal of claim 2, wherein the conductive layer is configured to at least a global positioning system (GPS) antenna, a Wi-Fi antenna, a Bluetooth™ antenna or an NFC antenna.

5. The mobile terminal of claim 2, wherein the conductive layer comprises a first conductive layer formed on a first region of the insulating layer and a second conductive layer formed on a second region of the insulating layer.

6. The mobile terminal of claim 5, wherein each of the first and second conductive layers provides at least a global positioning system (GPS) antenna, a Wi-Fi antenna, a Bluetooth™ antenna or an NFC antenna.

7. The mobile terminal of claim 1, wherein:
the cover member further comprises a contact terminal that is electronically connected to the conductive layer;
the controller comprises a connecting terminal that is electrically connected to the contact terminal; and
the connecting terminal is exposed to the contact terminal by penetrating a perforating hole provided in the rear case.

8. The mobile terminal of claim 7, wherein the connecting terminal comprises a clip configured to be inserted into or projected out of the perforating hole according to a status of contact between the connecting terminal and the contact terminal.

9. A mobile terminal comprising:
   a front case;
   a rear case mounted to the front case;
   a controller provided between the front case and the rear case;
   a wireless communication unit electrically connected to the controller;
   a power supply provided in the rear case; and
   a cover member provided on the rear case, the cover member comprising an insulating layer opposing the power supply and a conductive layer enclosing the insulating layer such that the conductive layer is externally exposed,
   wherein at least one portion of the insulating layer is externally exposed by penetrating the conductive layer,
   wherein the conductive layer is formed of a conductive ink or a metal-based material and comprises a plurality of penetrating holes,
   wherein the insulating layer is formed of a resin material and comprises a plurality of protections,
   wherein each of the plurality of projections is inserted into a corresponding one of the plurality of penetrating holes,
   wherein each of the plurality of projections has a cross-sectional area that decreases in a direction of its insertion into the corresponding one of the plurality of penetrating holes, and
   wherein each of the plurality of penetrating holes is configured to match the cross-sectional area of the corresponding one of the plurality of projections.

10. The mobile terminal of claim 9, wherein each of the plurality of projections is configured to connect the wireless communication unit to an external environment.

11. The mobile terminal of claim 9, wherein the conductive layer and the insulating layer are formed by injection molding.

12. The mobile terminal of claim 9, wherein:
   the cover member further comprises a contact terminal electrically connected to the conductive layer; and
   the contact terminal is electrically connected to the controller for wireless communication.

13. The mobile terminal of claim 12, wherein:
   the controller comprises a connecting terminal electrically connected to the contact terminal; and
   the connecting terminal is exposed to the contact terminal by penetrating a perforating hole provided in the rear case.

14. The mobile terminal of claim 13, wherein the connecting terminal comprises a clip configured to be inserted into or projected out of the perforating hole according to a status of contact between the connecting terminal and the contact terminal.

15. The mobile terminal of claim 12, wherein the conductive layer is configured to provide at least a global positioning system (GPS) antenna, a Wi-Fi antenna, a Bluetooth™ antenna or an NFC antenna.

* * * * *